United States Patent [19]

Tsujiuchi et al.

[11] Patent Number: 4,967,515
[45] Date of Patent: Nov. 6, 1990

[54] NUMERICALLY CONTROLLED GRINDING MACHINE

[75] Inventors: Toshio Tsujiuchi, Kariya; Norio Ohta, Okazaki; Masatomo Yoshimura, Toyoake, all of Japan

[73] Assignee: Toyoda Koki Kabushiki Kaisha, Kariya, Japan

[21] Appl. No.: 381,974

[22] Filed: Jul. 19, 1989

[30] Foreign Application Priority Data

Jul. 28, 1988 [JP] Japan .................. 63-189065

[51] Int. Cl.⁵ .................. B24B 49/03; B24B 51/00
[52] U.S. Cl. .................. 51/165.75; 51/165.76; 51/165.87
[58] Field of Search ........... 51/165.71, 165.74, 165.75, 51/165.76, 165.77, 165.8, 165.83, 165.93, 165.88, 131.1, 34, 165.87

[56] References Cited

U.S. PATENT DOCUMENTS

| | | | |
|---|---|---|---|
| 3,881,887 | 5/1975 | McMaster | 51/131.1 |
| 3,964,210 | 6/1976 | Moritomo | 51/165.71 |
| 4,118,900 | 10/1978 | Moritomo et al. | 51/165.77 |
| 4,154,024 | 5/1979 | Rajczi | 51/165.74 |
| 4,226,053 | 10/1980 | Inoue | 51/165.8 |
| 4,371,942 | 2/1983 | Damikolas | |
| 4,505,074 | 3/1985 | Kogure | 51/165.77 |
| 4,516,212 | 5/1985 | Nagashima | 51/165.71 |
| 4,524,547 | 6/1985 | Heaston et al. | |

FOREIGN PATENT DOCUMENTS 2579503 10/1986 France.

OTHER PUBLICATIONS

Patent Abstracts of Japan vol. 12, No. 91 (M-679) Mar. 24, 1988, & JP-A-62 228358 (Shinko Kogyo K. K.) Oct. 7, 1987. *The Whole Document*.

Primary Examiner—Frederick R. Schmidt
Assistant Examiner—Mark F. Frazier
Attorney, Agent, or Firm—Oblon, Spivak, McClelland, Maier & Neustadt

[57] ABSTRACT

A numerical control grinding machine, in which rough grinding and finish grinding wheels are used to machine a workpiece into a predetermined shape. A sensor detects the finish grinding wheel contacting the workpiece surface when shifting from the rough grinding to finish grinding operations and determines its position. The numerical controller of the grinding machine calculates the difference between actual and theoretical sizes of the workpiece and completion of the rough grinding operation based on the finish grinding wheel position. After that, the controller compensates the rough grinding wheel position in the next machining cycle for the difference calculated by the controller.

5 Claims, 5 Drawing Sheets

4,967,515

NUMERICALLY CONTROLLED GRINDING MACHINE

BACKGROUND OF THE INVENTION

The present invention relates to a numerically controlled grinding machine which performs external or internal grinding on a workpiece.

Conventionally is known a numerically controlled grinding machine which automatically selects a rough grinding wheel and finish grinding wheel sequentially according to a sequence of grinding operation of the workpiece. In such grinding machine, a workpiece is ground into a predetermined shape by the successive grinding from the rough to finish grinding operations while the workpiece is mounted on a spindle.

In the rough grinding operation with the rough grinding wheel, since the surface accuracy of the machined workpiece is not necessary to be considered, the purpose of using the rough grinding wheel is different from that of a finish grinding wheel and only the better workability or the grinding rates is emphasized. For that reason, a grinding wheel consisting of a single layer of abrasive grains formed by electro-deposition is often used as the rough grinding wheel and in that case from the economical point of view, the rough grinding wheel is thrown away without dressing to eliminate the wear and cracks thereof. Thus, for the rough grinding wheel, even the wheel size is not supervised by the numerical controller.

Now, the rough grinding wheel wears as it is used and its wheel diameter reduces gradually from the initial value. In rough grinding operation by the worn rough grinding wheel, then, the workpiece can not be ground to the theoretical machining sizes designed with the initial wheel diameter, leaving unground portion on the workpiece. As a result, an allowance for machining by the finish grinding wheel in finish grinding operation becomes larger than the theoretical value. Thus, the finish grinding amount to be ground by the finish grinding wheel increases more than necessity, which has the finish grinding wheel excessively over-loaded, so that the surface and size accuracies etc. of the machined workpiece are badly influenced and wheel life of the finish grinding wheel will be shortened.

SUMMARY OF THE INVENTION

It is therefore a primary object of the present invention to improve the surface and size accuracies of a machined workpiece.

It is another object of the present invention to leave a uniform finishing allowance for a finish grinding operation regardless of wear of a rough grinding wheel, thereby keeping a grinding load on a finish grinding wheel at a constant level.

It is a further object of the present invention to monitor the present diameter of the rough grinding wheel and the present position of the grinding surface of the rough grinding wheel accurately with a simple means.

In order to attain the objects aforementioned, a numerically controlled grinding machine according to the present invention comprises a sensor for outputting a signal when the finish grinding wheel contacts with the workpiece surface after the grinding operation has shifted from rough grinding to finish grinding, means for detecting the position of the finish grinding wheel when the signal is output from the sensor, means for calculating the difference between an actual size and a theoretical size of the workpiece at the end of the rough grinding operation based upon the finish grinding wheel position detected by the position detecting means, and position compensating means for compensating the position of the rough grinding wheel in the succeeding grinding cycle for the difference calculated by the calculating means.

In the present invention, the finish grinding wheel diameter and its present position are controlled precisely. At the point of time when the rough grinding is completed, the finish grinding wheel is fed till contacting with the workpiece surface. When the contact of finish grinding wheel with the workpiece surface is detected by the sensor, the present position of the finish grinding wheel at that time is read as a contact position. The actual workpiece size can be calculated from the contact position. Theoretical size of the workpiece at the end of the rough grinding operation is predetermined at the stage of machining design. Thus, the difference between the actual and theoretical sizes of the workpiece at the end of the rough grinding operation can be calculated. The difference is resulted from the decrement of the diameter of the rough grinding wheel from the initial diameter. That is caused by the deviations produced between the actual position of the grinding surface of the rough grinding wheel and the theoretical position thereof monitored by a numerical controller.

Accordingly, the position of the rough grinding wheel is compensated for the deviation from the succeeding rough grinding cycle. The actual position of the grinding surface of the rough grinding wheel then corresponds to the theoretical position, and in the succeeding rough grinding cycle, the workpiece can be machined into the theoretical sizes.

DESCRIPTION OF THE INVENTION

In the following, the present invention will be described on the basis of a specific embodiment.

Figure 1:
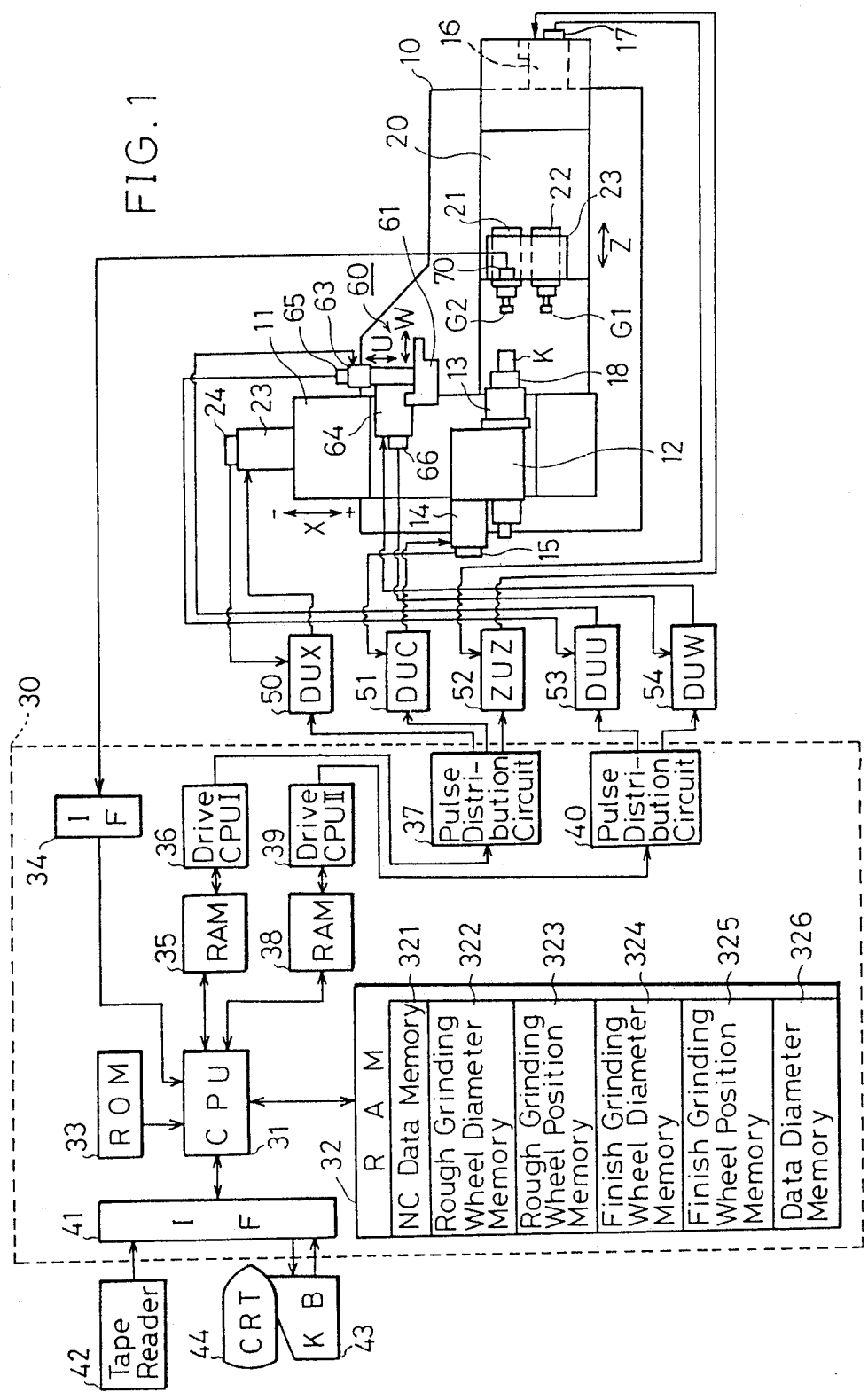
FIG. 1 is a block diagram showing mechanical and electrical configurations of a numerically controlled grinding machine according to one specific embodiment of the present invention.

In FIG. 1, the numeral 10 indicates a bed of the numerically controlled grinding machine, on which a table 11 driven by a servo motor 23 via a feed-screw mechanism, not shown, is disposed slidably in the direction of X-axis which is normal to a spindle axis. On the table 11, a headstock 12 supporting a spindle 13 rotated by a servo motor 14 is installed. A workpiece K is attached to the spindle 13 by a chuck 18.

Meanwhile, on the right hand side of the bed 10, a tool slide 20 is disposed slidably in the direction of Z-axis toward the workpiece K. On the tool slide 20, motors 21 and 22 supporting and driving a rough grinding wheel G1 and a finish grinding wheel G2, respectively, are mounted through a wheel head 23 and on the wheel head 23, for example, an acoustic emission sensor, hereinafter referred to as AE sensor, 70 which detects sounds is disposed as a sensor for detecting the contact of finish grinding wheel G2 with the workpiece K. The AE sensor 70 is connected to a CPU 31 via an interface 34 of a numerical controller 30. The tool slide 20 is coupled to a servo motor 16 via a feed screw, not shown, so as to be moved back and forth by the servo motor 16 rotating forward or reverse.

On the other hand, on the rear side of the table 11, there is provided a dresser 60 having a dressing tool 61 and capable of changing the relative position between the tool 61 and the finish grinding wheel G2. Feed of the dressing tool 61 toward the finish grinding wheel G2, or feed in the direction of U-axis is controlled by a servo motor 63, and feed parallel to the grinding surface of the finish grinding wheel G2, or in the direction of W-axis is controlled by a servo motor 64.

Drive units 50, 51, 52 are circuits for driving the servo motors 23, 14, 16, respectively, in response to the command pulses output from the numerical controller 30. Also, drive units 53, 54 are circuits for driving the servo motors 63, 64, respectively. To the rotary shafts of respective servo motors 23, 14, 16, 63, 64, pulse encoders 24, 15, 17, 65, 66 for detecting their rotating positions are connected respectively, and outputs of each of the pulse encoders 24, 15, 17, 65, 55 are fed back to the drive units 50, 51, 52, 53, 54 to make a negative feed back loop. Present positions of the respective feed axes X, C, Z are memorized in RAM 35 and are renewed when a pulse distribution is executed by a drive CPUI36. Similarly, present positions of each of the feed axes U, W are memorized in RAM38 and are renewed when a pulse distribution is executed by a drive CPUII 39.

The numerical controller 30 is designed mainly to numerically control rotations of control axes to control grinding operation on the workpiece and dressing on the finish grinding wheel G2, and principally comprises the CPU31 for controlling the grinding machine, a ROM33 storing the controlling programs and a RAM32 storing input data and so on. In the RAM32, an NC data memory 321 for storing the NC data, a rough grinding wheel diameter memory 322 for storing the present diameter of the rough grinding wheel G1, a rough grinding wheel position memory 323 as a position memory means for storing the present position of the grinding surface of the rough grinding wheel G1, a finish grinding wheel diameter memory 324 for storing the present diameter of the finish grinding wheel G2, a finish grinding wheel position memory 325 for storing the present position of the grinding surface of the finish grinding wheel G2, and a data diameter memory 326 as a data diameter memory means for memorizing a designed value of the diameter at the end of the rough grinding of the workpiece are formed.

Contents of the rough grinding wheel position memory 323 and the finish grinding wheel position memory 325 are renewed at real time, by inputting the present position data from the RAM35 whenever positions of respective wheels change.

In addition, in the numerical controller 30, the drive CPUI36, the RAM35 and a pulse distribution circuit 37 are provided as a driving system of the servo motors 23, 14, 16, and the RAM38, the drive CPUII 39 and a pulse distribution circuit 40 are provided as a driving system of the servo motors 63, 64. The RAM35 is a memory in which positioning data for the rough grinding wheel G1, finish grinding wheel G2, table 11 and spindle 13 are input from the CPU31. The RAM38 is a memory in which positioning data for the dressing tool 61 is input from the main CPU31. The drive CPUI36 outputs at a constant interval data indicating moving amount within the interval and feed velocity based on the positioning data input in the RAM35, and the pulse distribution circuit 37 is a circuit for outputting command pulses to each of the drive units 50, 51, 52 based on the data output from the drive CPUI36. Meanwhile, the drive CPUII 39 performs similarly as aforementioned based on the positioning data input in the RAM38 and the pulse distributing circuit 40 is a circuit for outputting command pulses to each of the drive units 53, 54 based on the data output from the drive CPUII 39.

To the CPU31, a tape reader 42 which inputs NC data, a keyboard 43 which inputs data and a CRT display 44 which displays data are connected via a input-output interface 41.

The numerically controlled grinding machine of the present invention is controlled by the NC data stored in the NC data memory 321 in the RAM32 of the numerical controller 30. After the rough grinding of the workpiece is executed by the rough grinding wheel G1, the wear rate of the rough grinding wheel G1 is detected and the present position of the rough grinding wheel G1 is compensated in order to shift the position of the rough grinding wheel G1 in the succeeding rough grinding cycle. Then the finish grinding is performed by the finish grinding wheel G2.

Control procedures of the numerical controller 30 according to the NC data will be described with reference to flow charts shown in FIG. 2 through FIG. 4.

Figure 2:
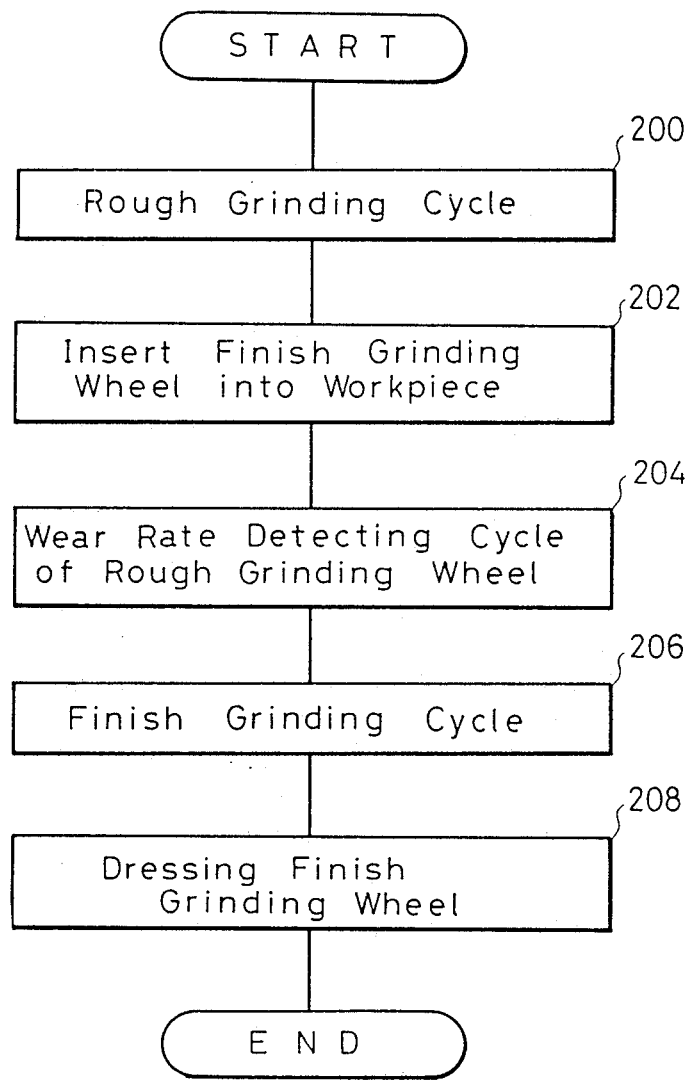
FIG. 2 is a flow chart showing a whole processing procedure of a numerically controlled grinding machine according to the present embodiment.

In FIG. 2, the NC data stored in the NC data memory 321 are read successively and cycles corresponding to the NC data are executed. In Step 200, in response to the read NC data, the rough grinding cycle is performed in accordance with the flow chart shown in FIG. 3. In Step 300, the target position is decoded from the NC data, and in the following Step 302, the present position of the rough grinding wheel G1 is read from the rough grinding wheel position memory 323. In the next Step 304, then the difference between the present and target positions is calculated as a moving amount and output to the RAM35. Then, in the next Step 306, the drive CPUI36 executes interpolations based on the moving amount and calculations of feed velocities for the slow-up and slow-down in order to output data indicating moving amount and velocity. In response to the data, the pulse distributing circuit 37 is driven, effecting the pulse distribution in proportion to the moving amount and driving the servo motors 23, 14, 16. When feeding of the designated moving amount is completed, in Step 308, the CPU31 determines whether it is the final step of the NC data in the rough grinding cycle. If NO, the procedure is returned to Step 300 and the next NC data are decoded. If YES, the grinding operation by the rough grinding cycle is completed. By the operation described above, the rough grinding cycle consisting of the rapid advance to a predetermined position, rough grinding feed, rapid retraction etc. of the rough grinding wheel G1 is executed by the NC data.

Figure 5:
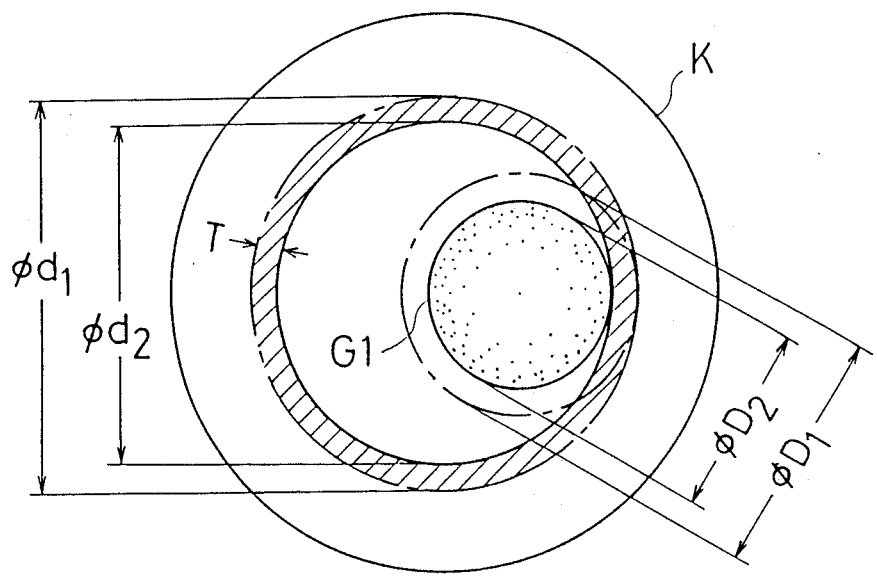
FIG. 5 is an explanatory view showing the relationship between a rough grinding wheel G1 and a workpiece K at the end of the rough grinding operation.
Figure 6:
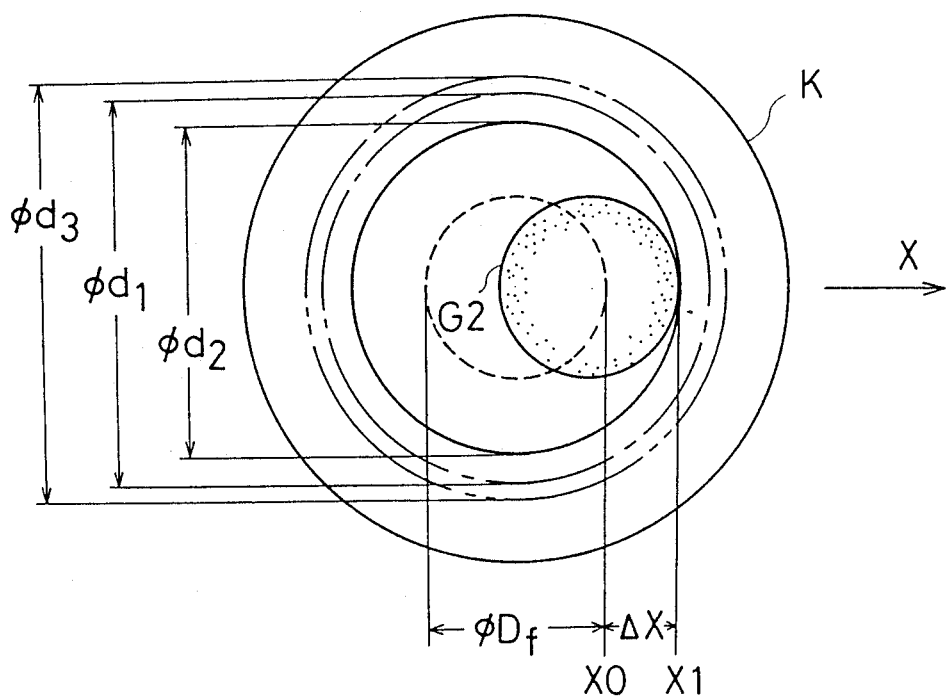
FIG. 6 is an explanatory view showing the relationship between a finish grinding wheel G2 and the workpiece K prior to entering the finish grinding operation.

In this state, as shown in FIGS. 5 and 6, if the rough grinding of the workpiece is completed by the rough grinding wheel G1 with the initial diameter $\phi D_1$ stored in advance in the rough grinding wheel diameter memory 322 in the RAM32 of the numerical controller 30, that is, if the wheel diameter $\phi D_1$ of the rough grinding wheel G1 is as it is and not worn, the actual diameter of the workpiece K at the end of the rough grinding operation corresponds with the data diameter (theoretical diameter) $\phi d_1$. The actual diameter of the rough grinding wheel G1, however, differs from the initial wheel diameter $\phi D_1$ stored in the rough grinding wheel diameter memory 322 in advance, and changes from $\phi D_1$, to $\phi D_2 (\phi D_2 < \phi D_1)$ by wear. Thus, the actual diameter of the workpiece K at the end the rough grinding operation is also, in practice, decreased from the data diameter $\phi d_1$ to $\phi d_2$ which is smaller by the unground amount T.

When the rough grinding operation is completed, the procedure is returned to Step 202 in FIG. 2 and a group of next NC data is decoded, and the table 11 is driven in the direction of X-axis such that the center line of the work piece K corresponds with the axis of the finish grinding wheel G2, thereafter, the tool slide 20 is moved toward +Z and the finish grinding wheel G2 is inserted into the workpiece K.

As the finish grinding wheel G2, a grinding wheel made of CBN is used, and is dressed by the dressing tool 61 of the dresser 60. The wheel diameter and the present position is monitored continuously and stored in the finish grinding wheel diameter memory 324 and the finish grinding wheel position memory 325 in the RAM32 of the numerical controller 30.

In this state, the center line of the workpiece K corresponds with the axis of the finish grinding wheel G2. The present position of the grinding surface of the finish grinding wheel G2 at this time is stored as the initial value X0 of the finish grinding wheel G2.

Figure 4:
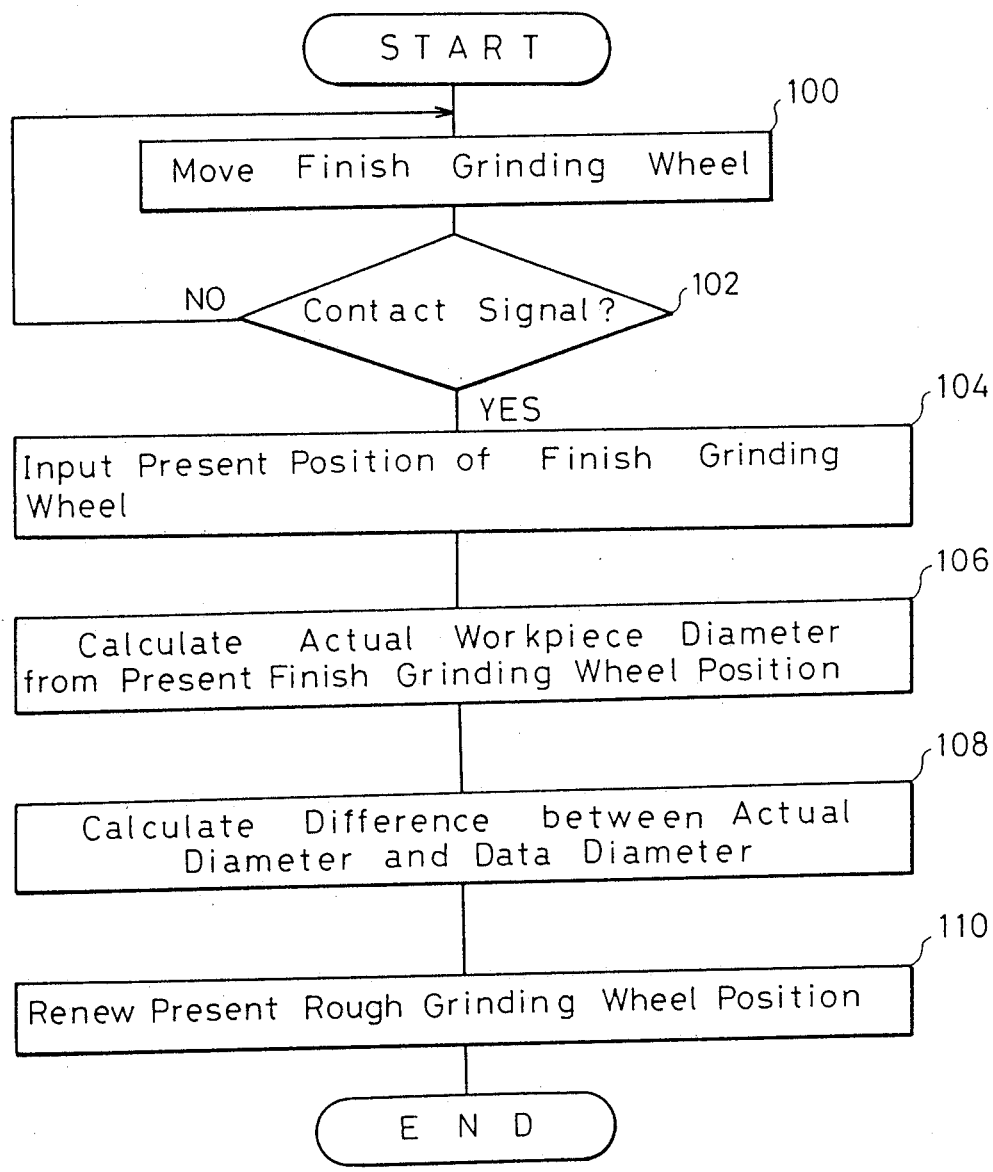
FIG. 4 is a flow chart showing a detailed procedure of a wear rate detecting cycle shown in FIG. 2.

Then, the procedure is moved to Step 204, wherein the rough grinding wheel wear rate detecting cycle is executed as the procedures shown in FIG. 4.

In Step 100, by moving the table 11 in the direction of +X-axis by a unit amount, the finish grinding wheel G2 is relatively moved toward the inner wall of the workpiece K by the unit amount. The relative moving direction of the finish grinding wheel G2 when the table 11 is moved in the +X-axis direction is defined as the +X-axis direction.

Then, the CPU31 moves its procedure to Step 102, wherein it is determined whether or not the finish grinding wheel G2 contacts with the surface of the workpiece K based on a signal input from the AE sensor 70.

When it is determined NO in Step 102, that is no contact signal is generated, since the finish grinding wheel G2 does not contact with the surface of the workpiece K yet, the procedure is returned to Step 100.

While it is determined NO in Step 102, that is the contact signal is not detected, the process of Step 100 is repeatedly executed and the finish grinding wheel G2 is moved continuously in the +X-axis direction toward the inner wall of the workpiece K.

When the finish grinding wheel G2 contacts with the workpiece K, a vibrating sound is detected by the AE sensor 70, from which contact signal is output to the CPU31 of the numerical controller 30, and it is determined YES in Step 102. Dimensional relationship between the workpiece K and the finish grinding wheel G2 is as shown in FIG. 6.

Next, the CPU31 moves its procedure to Step 104 composing position calculating means, and the contact position X1 is obtained by inputting to the CPU31 the contents of the finish grinding wheel position memory 325 when the contact signal from the AE sensor 70 is detected in Step 102.

Then, the CPU31 moves active execution to Step 106 composing present diameter calculating means, and the moving amount $\Delta x$ of the finish grinding wheel G2 is obtained by the following equation.

$$\alpha X = |X1 - X0|$$

Next, using the moving amount $\Delta x$ and the wheel diameter $\phi D_f$ of the finish grinding wheel G2 stored in the finish grinding wheel diameter memory 324, the actual diameter $\phi d_2$ of the workpiece K at the end of the rough grinding operation is calculated by the following equation.

$$\phi d_2 = 2\Delta x + \phi D_f$$

Then, the CPU31 moves active execution to Step 108, composing calculating means, and the difference between the actual diameter $\phi d_2$ of the workpiece K calculated in Step 106 and the data diameter $\phi d_1$ which is a theoretical value of the workpiece K at the end of the rough grinding operation stored in the data diameter memory 326 in advance, or the unground amount T at the end of the rough grinding is calculated by the following equation $T = |d_2 - d_1|$, where, $d_1 = \phi d_1/2$, $d_2 = \phi d_2/2$.

The unground amount T is, in other words, the wear rate of the rough grinding wheel G1. With this unground amount T, the stored value of the rough grinding wheel diameter memory 322 is compensated for and the rough grinding wheel diameter is renewed into a latest value. That is, when the old and new wheel diameters are defined respectively as $\phi OD$ and $\phi ND$, the latter is obtained by the following equation.

$$\phi ND = \phi OD - 2T$$

Thus, the diameter of the rough grinding wheel memorized in the rough grinding wheel diameter memory is compensated for to correspond with the actual diameter.

Meanwhile, moving to Step 110 composing position compensating means, and with the difference value T calculated in Step 108, the value stored in the rough grinding wheel position memory 323 in the RAM32 is compensated for. That is, if the old and new present positions are defined respectively as OX and NX, the new present position NX is obtained by the equation, NX=OX−T, and stored in the rough grinding wheel position memory 323.

Thus, the present position and diameter of the rough grinding wheel G1 are accurately compensated for. Then, in the succeeding rough grinding cycle, rapid advance, grinding feed etc. are controlled based on the latest values, that is the values $\phi ND$ and NX stored in the rough grinding wheel diameter memory 322 and rough grinding wheel position memory 323.

As such, when the wear rate detecting cycle of the rough grinding wheel is completed, the CPU31 returns its procedure to Step 206 to execute the finish grinding cycle.

Figure 3:
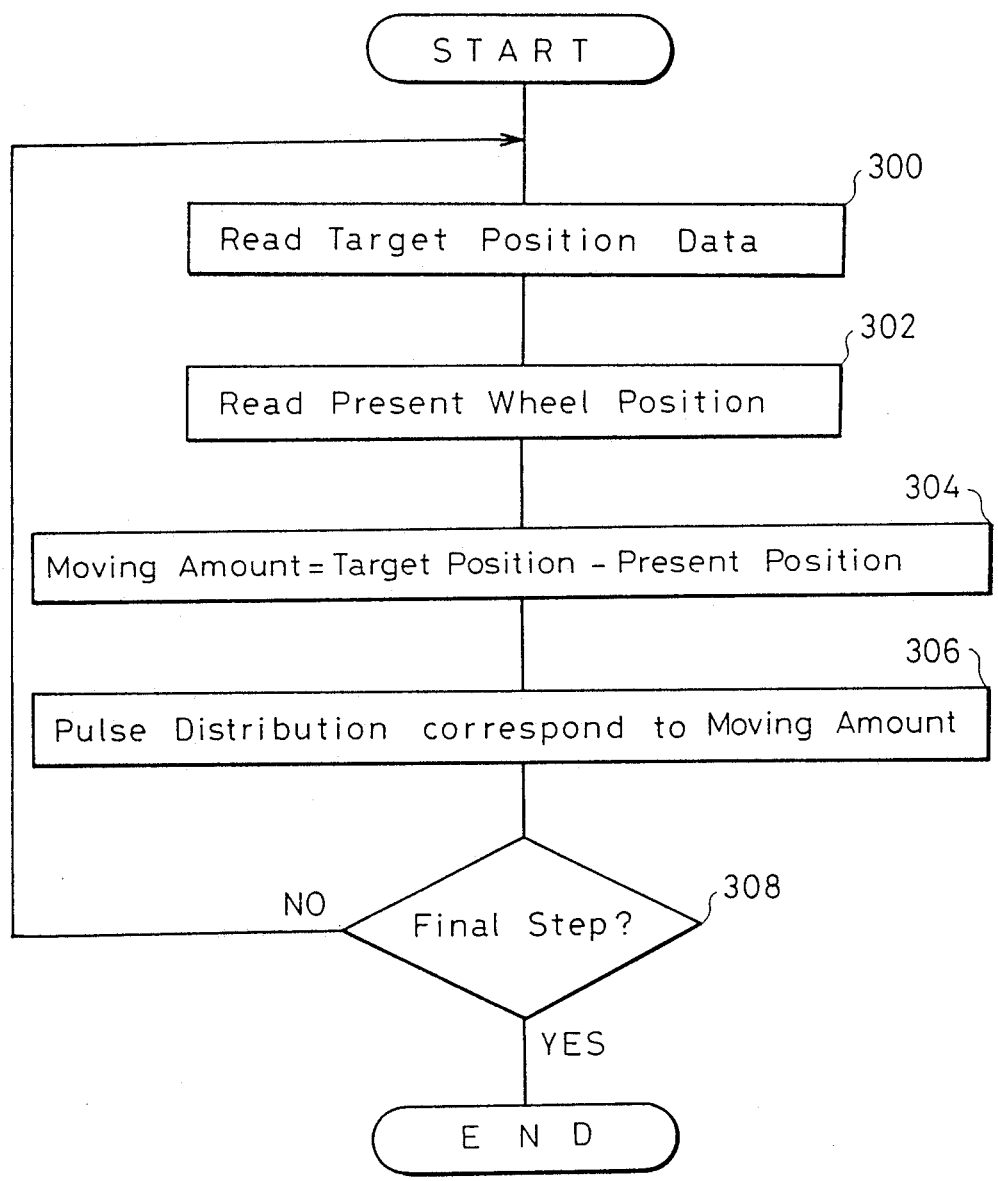
FIG. 3 is a flow chart showing detailed processing procedures of rough and finish grinding cycles shown in FIG. 2.

The finish grinding cycle is executed with the aforesaid flow chart shown in FIG. 3 which is used in the rough grinding cycle. In the finish grinding operation, however, for the present wheel position of Step 302, value stored in the finish grinding wheel position memory 325 is used. By the finish grinding cycle, the finish grinding operation is effected according to the NC data until the diameter of the workpiece K reaches to the finish diameter $\phi d_3$.

Next, when the finish grinding operation is completed, the CPU31 moves active execusion to Step 208, wherein wheel dressing processing of the finish grinding wheel is executed by the dresser 60. After dressing, the wheel diameter stored in the finish grinding wheel diameter memory 324 is renewed into the theoretical diameter, and the present wheel position stored in the finish grinding wheel position memory 325 is compensated for the dressing amount. Feed amount in the rough grinding wheel wear rate detecting cycle and the finish grinding cycle thereafter are controlled based on these latest wheel diameter and present position.

Then, in the next rough grinding cycle, the rough grinding operation takes place based on the renewed present position of the rough grinding wheel G1 stored in the rough grinding wheel position memory 323 of the RAM32. That is, the present grinding surface position of the rough grinding wheel G1 is compensated for based on the wear of the rough grinding wheel G1 and the position thereof is accurately controlled.

Thus, the theoretical feed amount of rough grinding is realized and the workpiece is ground into correct sizes.

As a sensor for detecting the contact of finish grinding wheel G2 with the surface of the workpiece K, besides the AE sensor aforementioned, a vibrometer, a dynamometer etc. may also be used as far as capable of detecting sounds, vibration and the like.

Furthermore, in the present invention, since the unground amount T is detected and the value of the rough grinding wheel diameter memory 322 is renewed, the size monitor can be achieved by reading out the value from the memory 322 and the operator is informed when to replace the wheel.

As described above, according to the present invention, allowances for machining by the finish grinding wheel at finish grinding operation can be controlled accurately, and the finish grinding operation is effected without applying excessive loads to the final grinding wheel. Thus, the accuracy of a final shape of a workpiece can be improved, and consequently wheel life of the finish grinding wheel can be lengthened.

What is claimed is:

1. A numerically controlled grinding machine in which a rough grinding operation with a rough grinding wheel and a finish grinding operation with a finish grinding wheel are accomplished to machine a workpiece into a predetermined shape comprising:
   feed means for moving said finish grinding wheel toward said workpiece after the completion of said rough grinding operation;
   a sensor for outputting a signal when the finish grinding wheel contacts with said workpiece surface during the movement of said finish grinding wheel by said feed means;
   position detecting means for detecting a position of said finish grinding wheel as a contact position when said signal is output from said sensor;
   calculating means for calculating the difference between an actual size of said workpiece after the completion of said rough grinding operation, which is determined by said contact position of the finish grinding wheel detected by said position detecting means and a theoretical size of said workpiece which is a target value for said rough grinding operation; and
   position compensating means for compensating said rough grinding wheel position in the next grinding cycle for said difference value calculated by said calculating means.

2. A numerically controlled grinding machine according to claim 1, wherein said calculating means comprises:
   present diameter calculating means for calculating the present diameter of said workpiece as said actual size from said contact position detected by said position detecting means;
   data diameter memory means for previously storing a data diameter of said workpiece which indicates said theoretical size of said workpiece in said rough grinding operation; and
   deviation calculating means for calculating the difference between the present diameter calculated by said present diameter calculating means and the data diameter stored in said data diameter memory means.

3. A numerically controlled grinding machine, according to claim 2, wherein said position compensating means comprises present position data compensating means for compensating present position data of said rough grinding wheel which indicates the present position of said rough grinding wheel and is renewed according to moving of said rough grinding wheel, based on said difference calculated by said deviation calculating means.

4. A numerically controlled grinding machine according to claim 3, further comprising.
   present position data memory means for storing present position data of said rough grinding wheel, which is compensated for by said present position data compensating means.

5. A numerically controlled grinding machine in which a rough grinding operation with a rough grinding wheel and a finish grinding operation with a finish grinding wheel are accomplished to machine a workpiece into a predetermined shape comprising:
   feed means for moving said finish grinding wheel toward said workpiece after the completion of said rough grinding operation;
   detecting means for detecting an actual size of said workpiece after the completion of said rough grinding operation;
   data diameter memory means for previously storing a data diameter of said workpiece which indicates a theoretical finish size of said workpiece in said rough grinding operation;
   deviation calculating means for calculating the difference between the actual size detected by said detecting means and the data diameter stored in said data diameter memory means; and
   position compensating means for compensating said rough grinding wheel position in the next grinding cycle for said difference value calculated by said calculating means.

* * * * *